E. M. & A. G. RAYBURN.
TRANSMISSION.
APPLICATION FILED JULY 16, 1917.
1,297,734.
Patented Mar. 18, 1919.
8 SHEETS—SHEET 1.
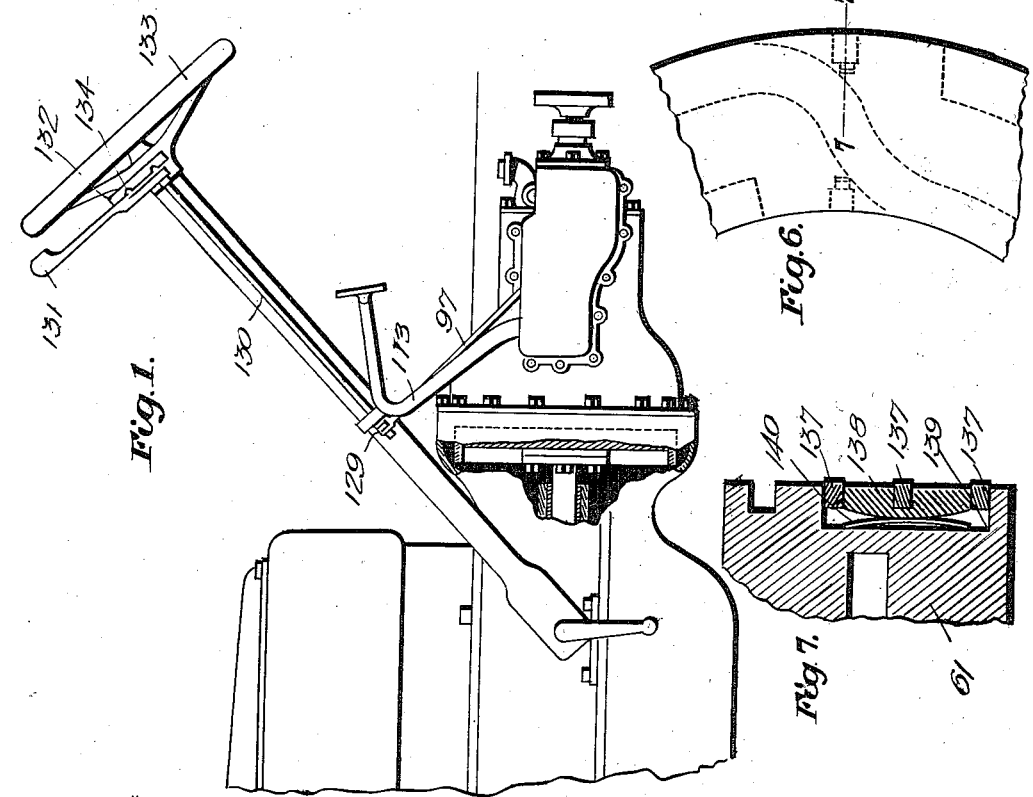
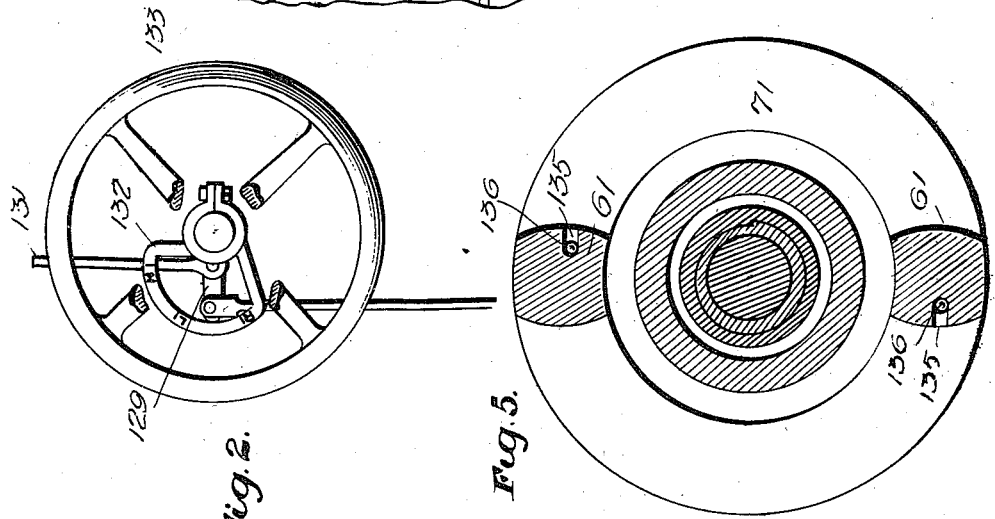
WITNESSES
INVENTORS
Elwyn M. Rayburn
Alden G. Rayburn
BY
ATTORNEYS

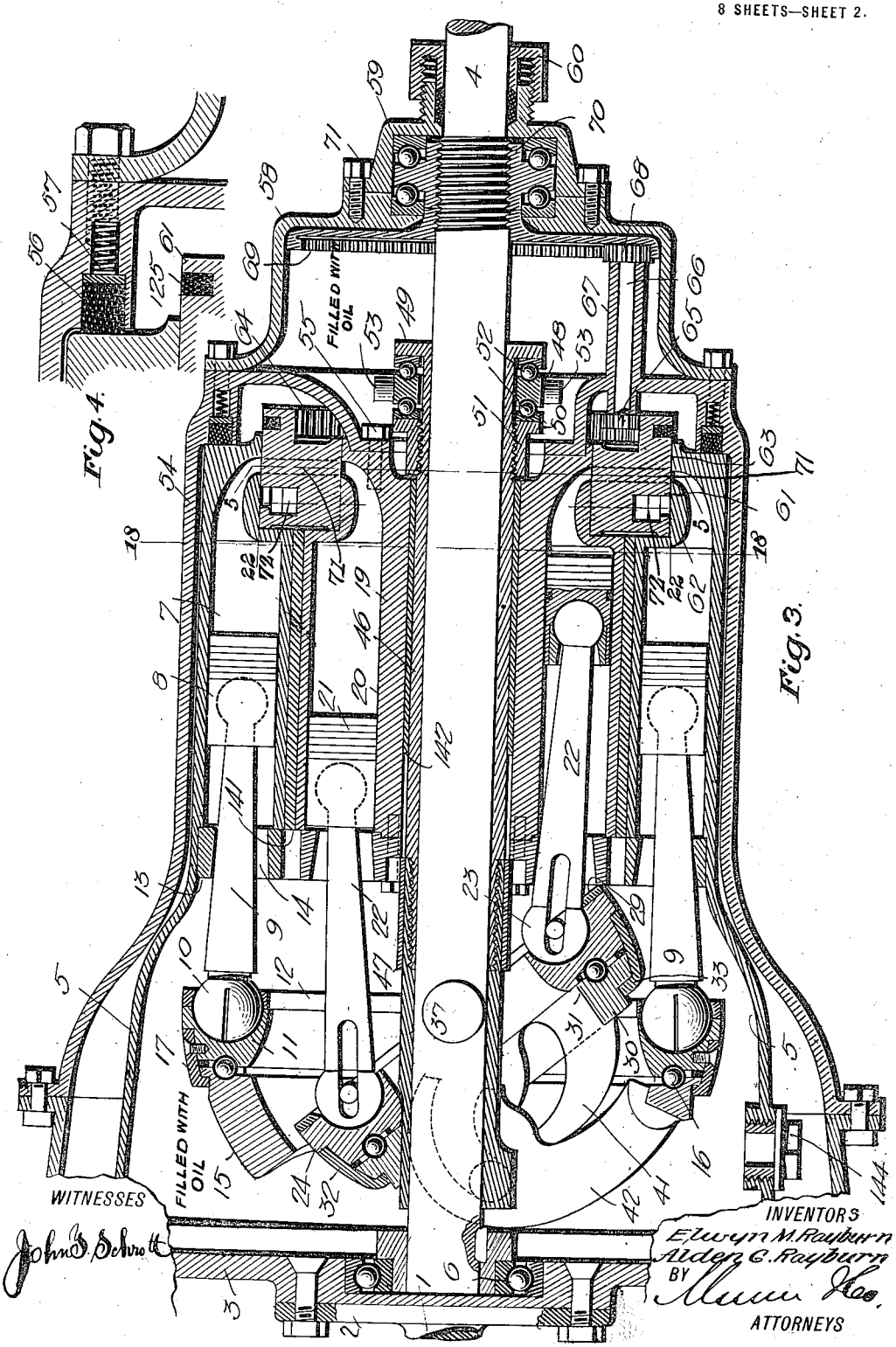

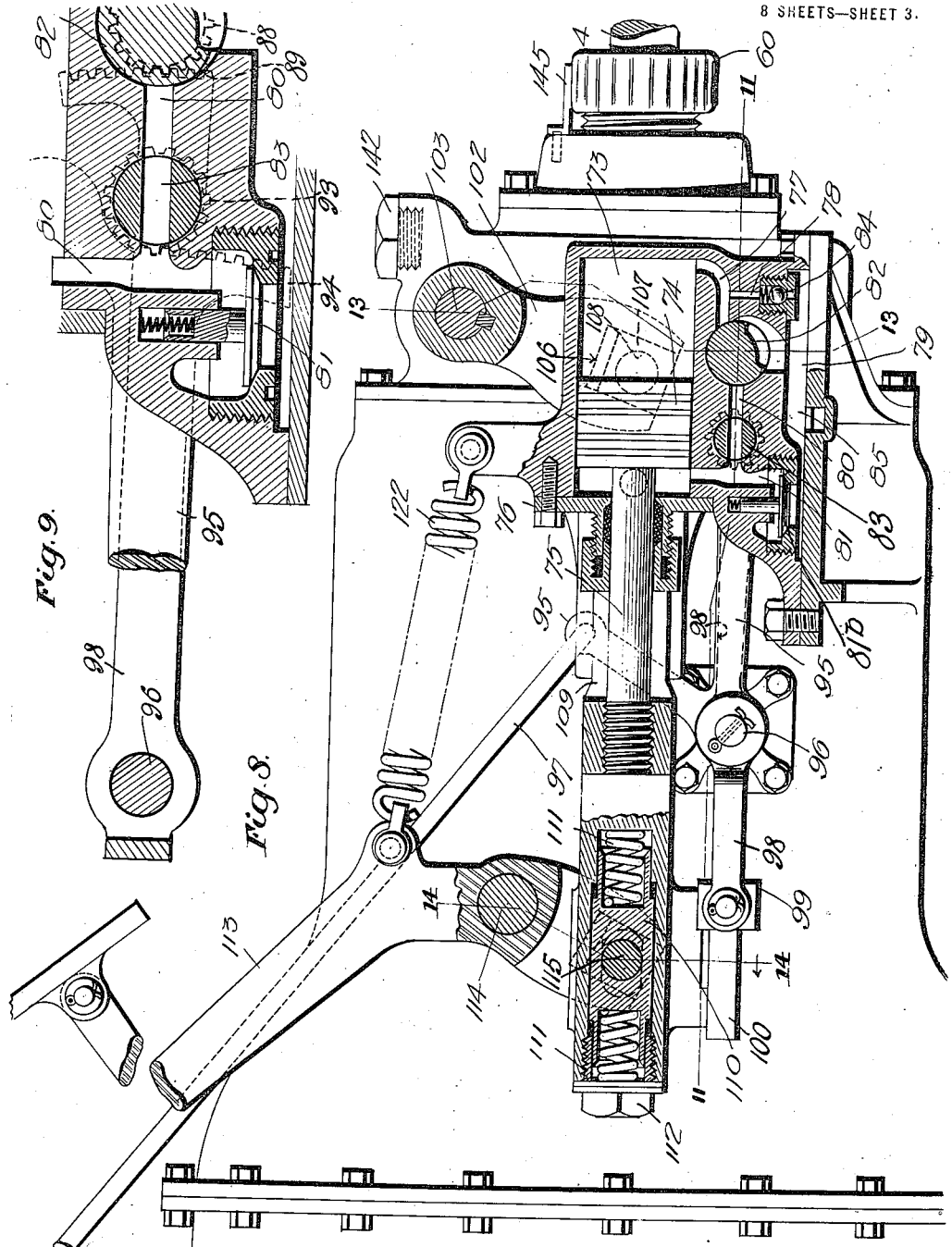

E. M. & A. G. RAYBURN.
TRANSMISSION.
APPLICATION FILED JULY 16, 1917.
1,297,734.
Patented Mar. 18, 1919.
8 SHEETS—SHEET 4.
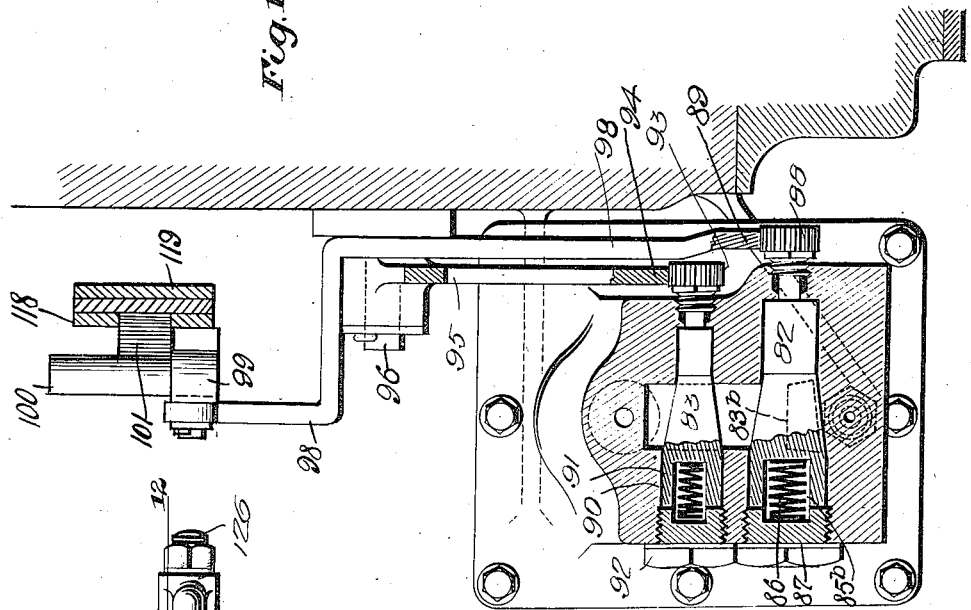
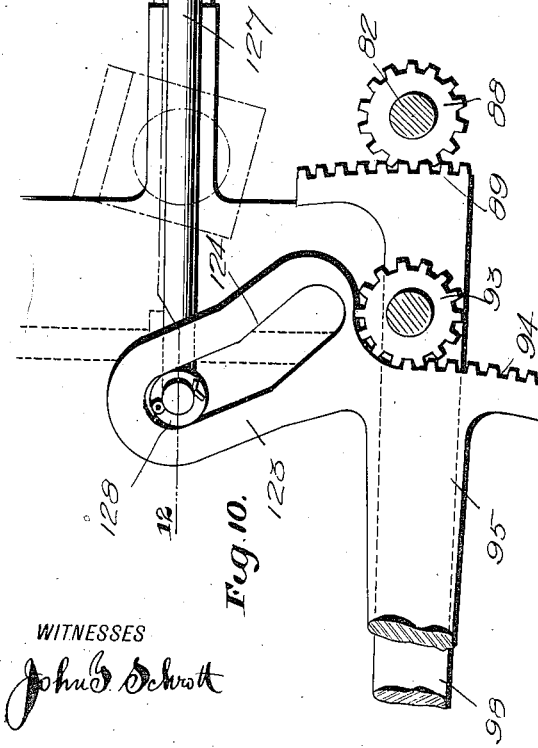
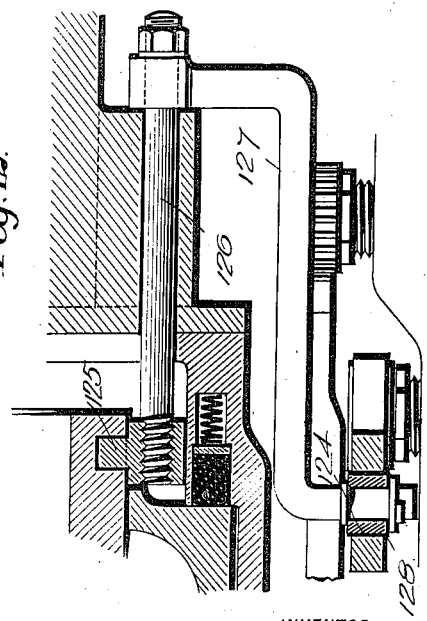
WITNESSES
INVENTORS
Elwyn M. Rayburn
Alden G. Rayburn
BY
ATTORNEYS

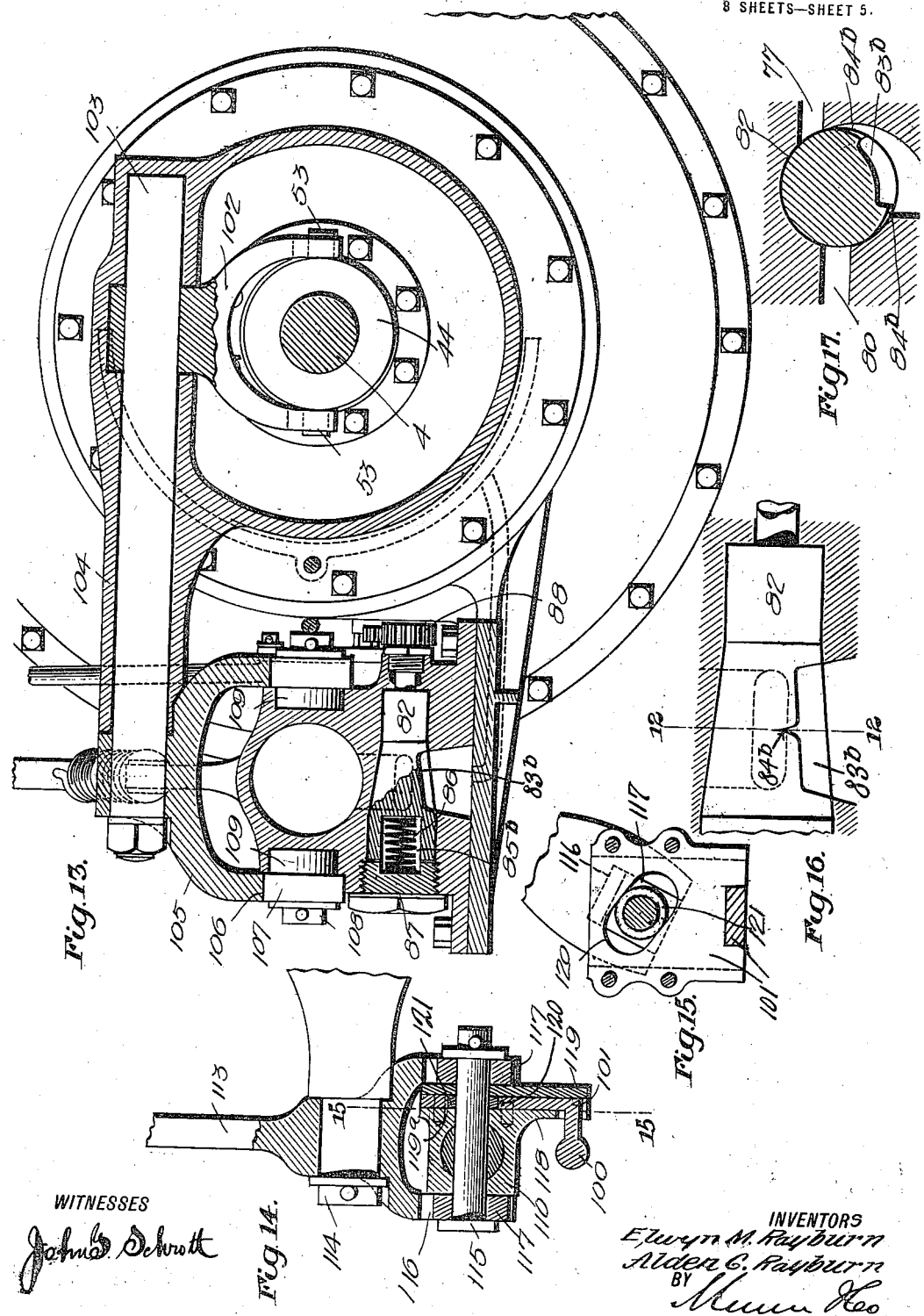

E. M. & A. G. RAYBURN.
TRANSMISSION.
APPLICATION FILED JULY 16, 1917.
1,297,734.
Patented Mar. 18, 1919.
8 SHEETS—SHEET 6.
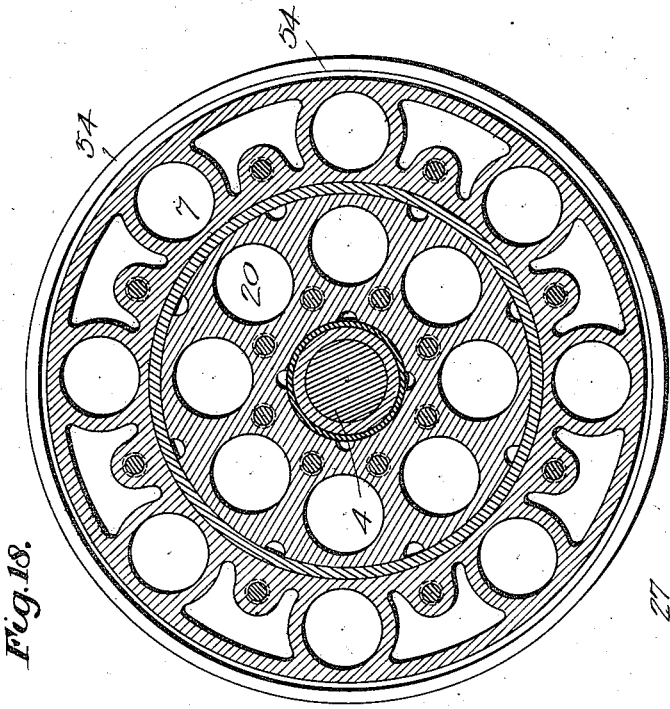
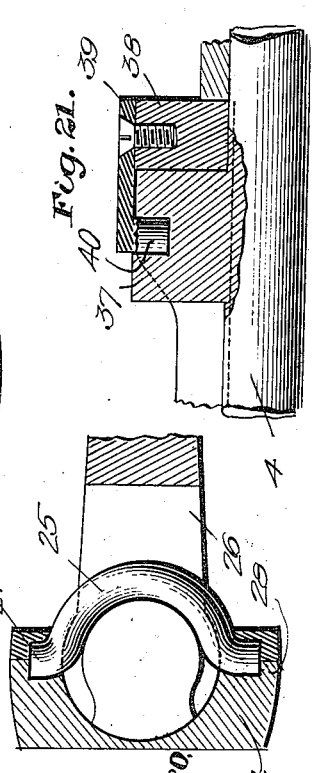
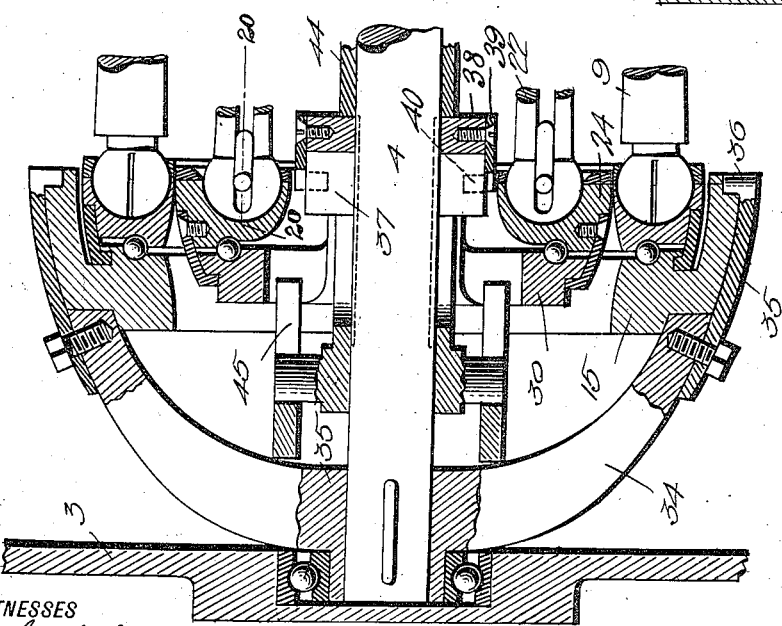

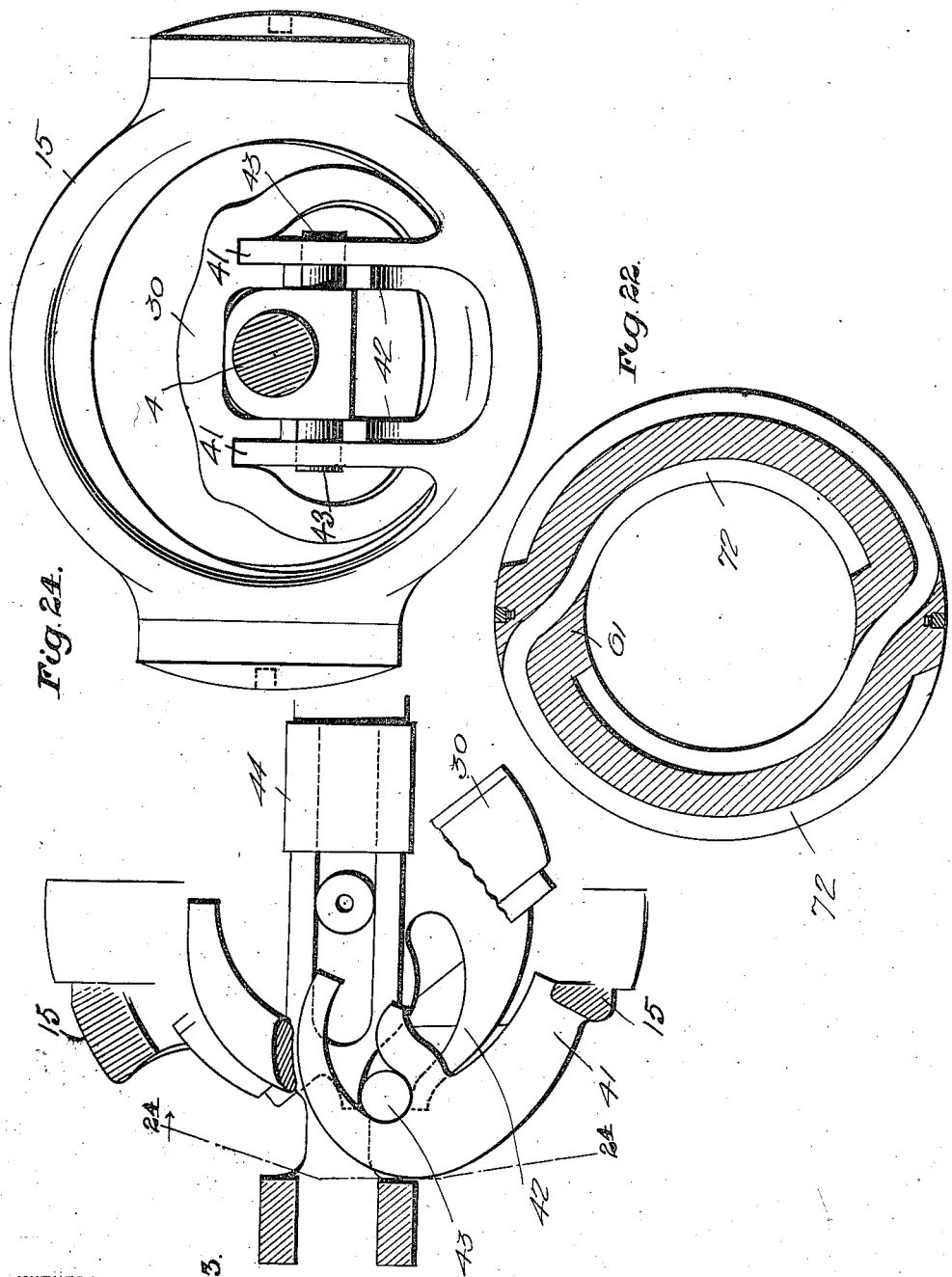

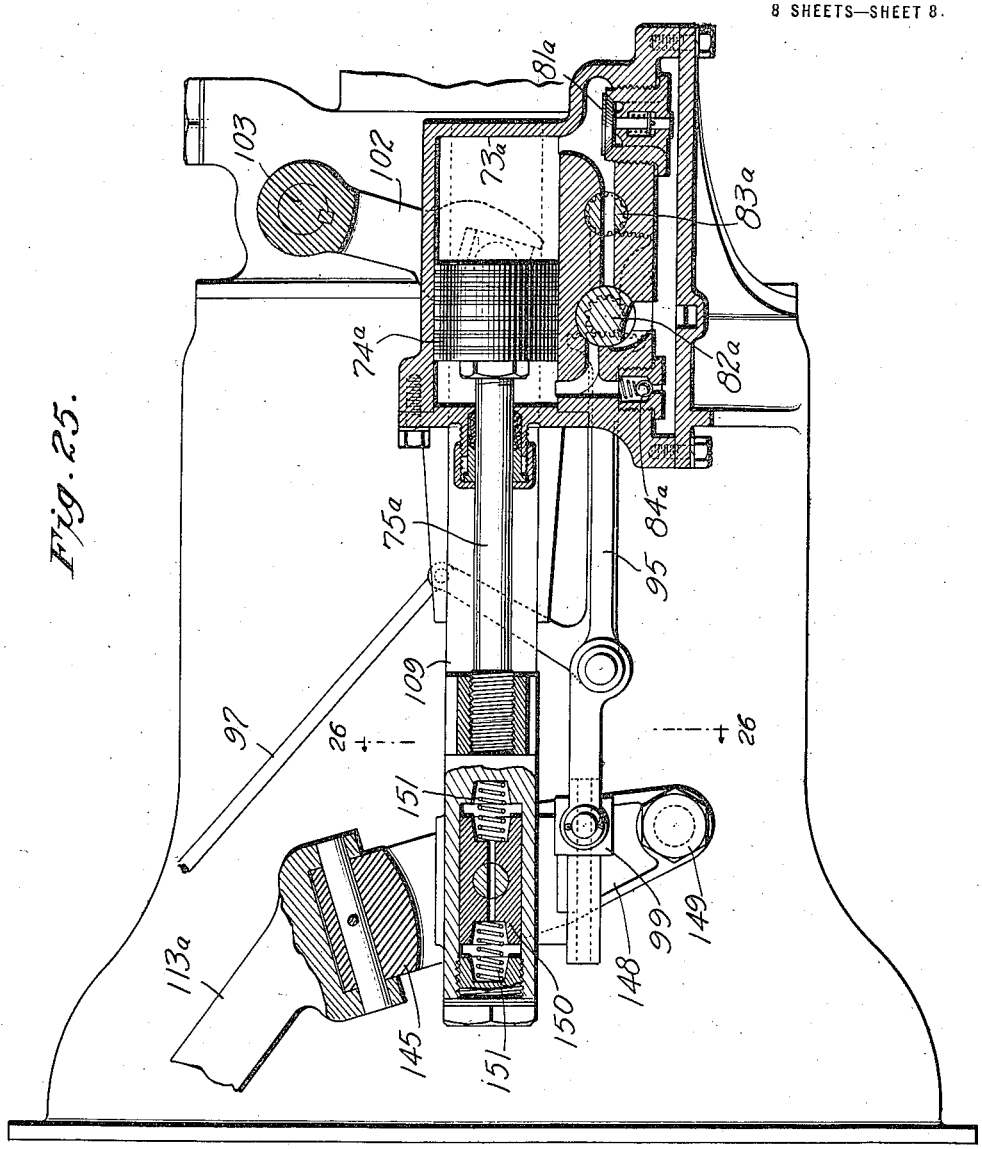
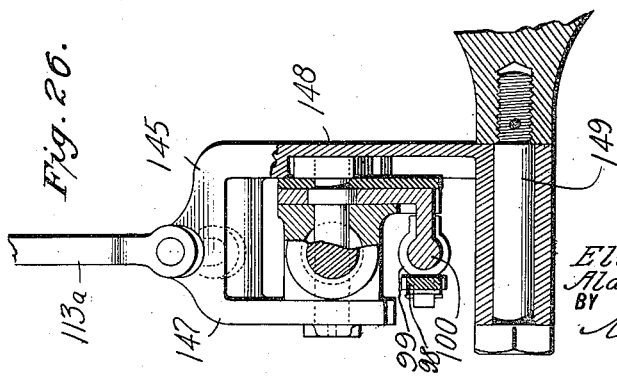

UNITED STATES PATENT OFFICE.

ELWYN METTE RAYBURN AND ALDEN GRANVILLE RAYBURN, OF SAUSALITO, CALIFORNIA, ASSIGNORS OF ONE-THIRD TO EDDY S. RAYBURN, OF SAUSALITO, CALIFORNIA.

TRANSMISSION.

1,297,734.  Specification of Letters Patent.  Patented Mar. 18, 1919.

Application filed July 16, 1917. Serial No. 180,843.

*To all whom it may concern:*

Be it known that we, ELWYN METTE RAYBURN and ALDEN GRANVILLE RAYBURN, citizens of the United States, and residents of Sausalito, in the county of Marin and State of California, have invented new and useful Improvements in Transmissions, of which the following is a specification.

Our invention is an improvement in transmissions, and has for an object to provide a transmission especially adapted for use with motor vehicles and the like, wherein fluid-controlled means is provided for connecting the driving shaft to the driven shaft at any desired speed, and wherein means is provided in connection with the transmission for converting into use that portion of the power of the motor which is usually wasted when the driving and driven shafts are not directly connected.

In the drawings:

Figure 1 is a side view, with parts in section, of the controlling mechanism for the transmission;

Fig. 2 is a plan view of the steering wheel, with parts broken away;

Fig. 3 is a longitudinal section of the transmission;

Fig. 4 is an enlarged detail of a portion of Fig. 3, showing the packing;

Figs. 5, 18 and 22 are sections on the lines 5—5, 18—18 and 22—22, respectively, of Fig. 3;

Fig. 6 is a partial side view of the valve;

Fig. 7 is a section on the line 7—7 of Fig. 6;

Fig. 8 is a sectional view of the controlling mechanism for the transmission;

Fig. 9 is an enlarged detail of a portion of Fig. 8, showing the valve mounting;

Fig. 10 is an enlarged detail of the controlling mechanism for the reversing valve;

Figs. 11, 13 and 14 are sections on the lines 11—11, 13—13 and 14—14, respectively, of Fig. 8, Fig. 14 looking in the direction of the arrow adjacent to the line;

Fig. 12 is a section on the line 12—12 of Fig. 10;

Fig. 15 is a section on the line 15—15 of Fig. 14;

Fig. 16 is an enlarged side view of the controlling valve for the transmission;

Fig. 17 is a section on the line 17—17 of Fig. 16;

Fig. 19 is a partial section of the left end of Fig. 3, taken at right angles to Fig. 3;

Fig. 20 is a section on the line 20—20 of Fig. 19;

Fig. 21 is a detail section showing the connection between the holder and the ring;

Fig. 23 is a detail view, with parts broken away, of the operating mechanism for the ring;

Fig. 24 is a section on the line 24—24 of Fig. 23, looking in the direction of the arrows adjacent to the line.

Fig. 25 is a longitudinal section of a modified form of controlling mechanism;

Fig. 26 is a section on the line 26—26 of Fig. 25, looking in the direction of the arrows adjacent the line.

In the present embodiment of the invention, the driving shaft 1 has, at the end thereof, a plate or disk 2 which is securely bolted to the head 3 of the rotating part of the transmission casing, the said casing constituting, in effect, a fly wheel, and the driven shaft 4 is journaled at the center of the casing 5, the said shaft extending to the head 3 and being journaled in a combined radial and thrust bearing 6.

The casing 5 is rotatable, and this casing carries a series of cylinders 7, the said series being arranged in an annular form about the shaft as an axis, and in each cylinder is a piston 8, each piston having the usual rings, as shown. Each piston 8 has a rod 9 connected therewith by a ball and socket joint, and at its outer end each rod has a split head or ball 10, which is received within a socket in a ring 11, and is held in place by a ring 12 having openings of such diameter that the balls may not pass, and this ring 12 is secured to the ring 11 in any suitable or desired manner. A ring 13 is connected to the ends of the cylinders, and the said ring has openings 14 for each piston rod, the said openings being so shaped as to permit the rods 9 to press against the inside of the opening as a bearing during half the stroke of the connecting rod. The purpose of these rings 13 is to keep the ring 11 within limited lateral motion with respect to the cylinders.

A circular holder or trackway 15 is arranged at the outer face of the ring 11, and a ball bearing 16 is arranged between the holder and the ring, and the holder is kept in proper position with respect to the ring by a ring 17 secured to the ring 11 and having a marginal flange 18 engaging a ledge or shoulder on the holder. By means of the holder the inclination of the ring may be varied, while at the same time the ring is free to rotate with respect to the holder.

A stationary casing 19 is mounted inside the casing 5, and inside the annular series of cylinders, and this casing contains a series of cylinders 20. In each cylinder 20 a piston 21 is mounted, and each piston has connected therewith one end of a rod 22, the connection being by a ball and socket joint. Each rod 22 has a head at its outer end, and each of these heads is received in a socket in a ring 24. Referring to Figs. 19 and 20, it will be noticed that these heads are retained in place by means of a substantially U-shaped clip 25, which passes through a split 26 in the rod and head, and has radially extending lugs 27 at its ends, which engage recesses 28 in the ring.

A ring or washer 29 is secured to the ring 24 on its inner face, and a circular holder or guide 30 is arranged adjacent to the outer face of the ring. A ball bearing 31 is arranged between the holder and the ring, and the holder is held to the ring by rings 32 resembling the rings 17, the said rings 32 having marginal flanges 33 engaging a shoulder or ledge on the holder.

The holder 15 before mentioned is supported by arms 34 which extend in opposite directions from a hub 35 keyed to the driven shaft 4, the said arms curving outwardly and toward the holder, to which they are connected by a ring 35. This ring is secured to the arms as shown, and has a marginal flange 36 engaging a shoulder or ledge on the holder. The holder 30 is supported by the shaft 4, the said shaft having oppositely extending integral lugs 37 to which the holder is connected. The holder has an extension 38 which forks at the end remote from the holder, and the arms of the fork extend over the opposite sides of the shaft at the lugs 37. A plate 39 is secured to each arm of the fork (Figs. 19 and 21) and each of these plates extends across the end of the adjacent lug 37 and is provided with a pin 40 engaging a recess in the lug. Thus both holders are supported by the shaft 4. Each of the holders 15 and 30 is provided with a pair of parallel arc shaped arms 41 and 42, respectively, (Fig. 3) the said arms extending inwardly toward the shaft 4, as shown, and the members of each pair extend on opposite sides of the shaft. The arms have arc shaped slots, and the said slots of the arms engage lugs 43 extending laterally from a sleeve 44 which is mounted to slide on the shaft 4, and it will be evident that when the sleeve is moved the holders will be swung. It will be noticed from an inspection of Figs. 3 and 23 that the slots of the arms 41 and 42 are oppositely arranged. This sleeve has slots 45 for permitting the passage of the lugs 37, and the sleeve is connected to a second sleeve 46 arranged between the casing 19 and the shaft 4 by a threaded connection, a third sleeve 47 encircling the two sleeves at the connection.

A collar 48 is arranged at the end of the sleeve 46 remote from the holders, between a radial rib 49 on the end of the sleeve 46 and a similar rib 50 on a sleeve 51 which is threaded on to the sleeve 46 at the inner side of the collar. Ball bearings 52 are arranged between the collar and the flanges 49 and 50, and the collar has oppositely extending lugs 53 for engagement by operating mechanism to move the sleeve. The casing 5 is inclosed by a second stationary casing 54, and at the end remote from the holders the casing 54 has its end connected to the casing 19, as indicated at 55.

A packing ring 56 is arranged between the adjacent ends of the casings 5 and 54, and this ring is normally pressed toward the end of the casing 5 by coil springs 57 arranged within recesses in the casing 54. An extension 58 is connected with the said end of the casing 54, and this extension is connected with a cap 59 at its outer end, the said cap carrying a stuffing box 60 in which the shaft 4 is journaled. The casing 5 and the extension 58 are adapted to be filled with oil, and the cylinders of the casings 5 and 19 are adapted to pump this oil from one series to another.

The passage of the oil from the cylinders is controlled by a rotary valve 61, the said valve being in the form of a ring, which encircles the shaft 4 between the casings 5 and 19 within an annular valve chamber 62 formed by the two casings 5 and 19, and the said valve extends through an annular opening 63 between the two casings 5 and 19 into the space formed between the ends of the casings 5 and 54. Here the valve has an internal gear ring 64, which is engaged by a pinion 65 on a shaft 66 journaled in a bushing 67 in the end of the casing 54. This shaft 66 has a pinion 68 at its outer end, which meshes with an internal gear ring 69 mounted on the shaft 4. The said gear ring is formed with a disk which has a hub 70, having threaded engagement with the shaft 4, and a double ball bearing 71 is arranged between the hub, the end of the casing 58 and the cap 59. When the shaft rotates, the annular valve 61 will rotate therewith. This valve, shown in detail in Figs. 5 and 22, has two positions, the said valve being movable longitudinally in the valve chamber, and it will be noticed that the gear ring 64 is of sufficient width to permit movement without disengaging the said ring from the pinion 65. In the position of the valve shown in Fig. 3, which is the position for all forward motions of the transmission, ports 71 form a communication between the cylinders 7 and the cylinders 20, and the said ports, which are shown in Fig. 5 arc shaped and in the plane of the valve, extend over approximately a semi-circle, only enough of the material of the valve being left between the ends of the ports to separate the ports. This position is indicated by dotted lines in Fig. 3, the ports 71 forming a direct communication between the cylinders 7 and 20.

In order to obtain the reverse motion, the valve is moved longitudinally to bring the other ports 72, shown in Fig. 22, into register with the ports that place the cylinders 7 and 20 into communication, that is, to bring the ports 72 of Fig. 3 into the position occupied by the ports 71 in the said figure. The said passages 72 extend from the periphery of the valve at opposite points thereof to the inner edge of the valve, extending over almost the entire circumference of the valve, and delivering near where they enter, but at the opposite edge of the valve. Thus when the valve is moved longitudinally to bring the ports 72 into register with the passages between the cylinders 7 and 20, the oil passing from one series of cylinders to the other will be delivered at two points almost diametrically opposite the point of delivery when the valve is in the position of Fig. 4. With the ports 71 connecting the cylinders 7 and 20 the flow of the oil is direct and radial. With the ports 72 between the cylinders, the oil must travel, in order to pass from the cylinders 7 to the cylinders 20, to a point diametrically opposite, that is, in passing from a cylinder 7 to a cylinder 20 the oil must pass to a point practically diametrically opposite where it enters the port 72. This will be evident from an inspection of Fig. 22.

Movement of the valve 61 is controlled by the controlling mechanism for the transmission, to be described. The said mechanism comprises a cylinder 73, in which is arranged a piston 74, and a rod or shaft 75 is connected with the piston, and extends through a stuffing box in one head of the cylinder, the said head 76 being detachable, as shown. The cylinder has ports 77, 78, 79, 80 and 81, and valves 82, 83 and 84 are provided for controlling the ports. The ports 77, 78, 79 and 81 are arranged to place the ends of the cylinder in communication with the interior of the casing 5 through a chamber 85 with which the said ports communicate. The valves 81$^b$ and 84 are spring-controlled check valves, both permitting the fluid to pass from the chamber 85 into the respective ends of the cylinder when the pressure in the chamber exceeds that in the cylinder. When the piston moves toward the right the fluid may be drawn into the left end of the cylinder through the passage 81, while when the piston moves to the left the fluid may pass into the cylinder through the ports 77 and 78.

The valve 82, shown more particularly in Figs. 16 and 17, has a conical portion, intermediate the ends of which is a groove 83$^b$ extending circumferentially of the valve, and thin extensions 84$^b$ lead from each end of the groove, the said extensions gradually decreasing in width and depth. The large end of the valve is recessed, as shown at 85$^b$, and a coil spring 86 is arranged within this recess, between a nut 87 threaded into the casing and the bottom of the recess, the spring acting normally to force the valve to its seat. At the opposite end a pinion 88 is secured to the stem of the valve, and this pinion is engaged by a rack bar 89 to be later described. The valve 83 is mounted like the valve 82, having the recess 90, the coil spring 91 therein, and the nut 92 engaging the spring to force the valve toward its seat, and the valve has a conical portion, as shown in Fig. 11. This valve has a transverse diametrical passage, as shown in Fig. 8, and when the valve is in the position in the said figure the port or passage 80 will be open, while when the valve is turned a quarter turn the port will be closed. A pinion 93 is secured to the small end of the valve, and this pinion is engaged by a rack bar 94 to operate the valve. The rack bar 94 is on one of the arms of a bell crank lever 95, which is journaled on a pin 96 extending laterally from the casing, and a link 97 connects the other arm of the bell crank with operating mechanism to be described. The rack bar 89 is on one end of a lever 98 also pivoted on the pin 96 intermediate its ends, and having at its front end a sliding block 99, which has a sliding engagement with a laterally extending lug 100 on a cam plate 101, which is moved vertically, under conditions to be presently described, to swing the arm 98 to operate the valve.

The connection between the sleeve 44 and the controlling mechanism is shown in Figs. 8 and 13 and comprises a fork 102, whose arms are connected with the lugs 53 before mentioned, the said fork being shown more particularly in Fig. 13. This fork is secured to one end of a shaft 103 journaled in a bushing 104 in the casing, and a second fork 105 is secured to the outer end of the shaft (Fig. 13). The arms of the fork 105 have notches or recesses 106 in their ends, which are engaged by slide 130 blocks 107 pivoted to laterally extending pins 108 on the arms of another fork 109. The arms of this fork extend longitudinally of the shaft 75, on opposite sides thereof, and body of this fork has threaded engagement with the shaft 75, as shown in Fig. 8, and beyond the body of the fork the shaft is enlarged and chambered, as shown in said figure. A guide 110 is arranged in the chambered portion, and coil springs 111 are arranged between the guide and each end of the chamber, the outer end of the chamber being closed by a threaded plug 112. A pedal or treadle 113 is pivoted to the casing at 114, and the lower end of the treadle is forked, the arms engaging opposite sides of the guide 110, and being pivoted thereto by a bolt 115. There are slots in the sides of the enlargement at the outer end of the fork 109 in which the pin 115 may move. The lower ends of the arms of the fork of the treadle 113 are recessed, as shown at 116, to form guideways, and blocks 117 are mounted to move in the guideways. Thus the guideways will move with the block without interfering with the movement of the treadle. The cam plate 101 before mentioned is arranged at one side of the guide, the said guide having a depending portion 118 at its side, and the plate is held in place by a holding plate 119. The cam plate 101 is mounted for vertical movement, having an angular slot 120, which is engaged by a roller 121 on the bolt 115. It will be obvious that when the guide 110 is moved longitudinally the plate 101 will be swung, and the lug 100 will swing on an arc whose center is the bolt 115, being thus raised and lowered, and the lever 98 connected therewith will be swung. The treadle 113 is normally spring-held rearwardly by a coil spring 122 arranged between the treadle and the casing, and it is adapted to be pressed forward by the foot of the driver.

The reversing mechanism of the reversing valve is operated through the movement of the arm 95. This arm has an extension 123 just above the pinion 93, and the extension is provided with an angular slot 124. The valve 61 has an annular groove for receiving a ring 125, and a rod 126 connected with this ring extends outwardly through the casing, where it is connected to a double angle arm 127. The body of this arm extends substantially parallel with the rod 126, and at the end remote from its connection with the rod 126 a roller 128 is journaled on the rod, and the said roller engages the slot 124 of the extension of the arm 95. The arrangement of the slot 124 is such that when the rear end of the arm 95 is moved upwardly beyond a predetermined distance the roller 128 will be moved rearwardly or toward the extension 58 of the casing, to bring the ports 72 into operative position, and to bring the ports 71 out of such position.

The link 97 before mentioned extends forwardly and upwardly to a connection with a radial arm 129 on the lower end of a shaft 130 journaled in bearings on the steering post. The shaft is provided at its upper end with a handle 131, and an arc shaped bracket or segment 132 is secured to the support of the steering wheel 133 just above the handle 131. This segment has notches 134 on its under side, which are adapted to be engaged by the handle, to hold the handle in adjusted position, and at each notch on the upper face of the segment is a letter, the said letters being respectively "R", "L" and "N", and designate "reversed", "locked" and "neutral" position of the controlling mechanism.

In operation, the operator will push the pedal 113 to its extreme forward position, where it may be either held by the foot or the handle 131 on the steering column may be moved to the position indicated by the letter "L". When the pedal is pushed to its extreme forward position, it may be held by the foot or it may be held by moving the handle 131 to the letter "L". The moving of the handle to this position locks the piston 74 in forward position as hereinafter described, and also moves the parts into neutral position. The operation of the transmission to "forward" or "reverse" is brought about by the rearward movement of the pedal. This movement of the handle to the position "L" swings the bell crank 95, rotating the valve 83 to cause the passage through the said valve to stand at right angles to the port 80, thus closing the passage 81 and trapping the oil on that side of the piston nearest the treadle. The oil here is held from flowing to the chamber 85 by the valve 81ᵇ. Hence the spring 122 cannot return the treadle from its forward position, even when the operator moves his foot. At this stage of the operation the motor may be started, and will run without energy being transferred to the driven shaft because the transmission is in neutral position. It will be understood that upon starting the motor all of the elements of the clutch unit, that is, the cylinders 7 and associated parts, will revolve as a fly wheel, the casing 5 rotating in the stationary casing 54 which acts as a bearing for the said fly wheel. The ring 11 of the clutch unit rotates in one plane only, and has no tendency to gyrate, that is, the cylinders 20 and associated parts will also remain stationary because there is no pumping action.

The operator now wishing to start the vehicle will either permit the pedal to move slowly backward under the pressure of his foot or he can regulate the backward movement by means of the handle 131. To do the latter, he will gradually move the handle from position L to position H. When the handle is moved to position L the valve 83 is closed as above stated while, when the handle is moved to the position H, the valve is open. By gradually moving the handle from position L toward H the valve 83 is gradually and slowly opened, and the pedal will gradually move through all the positions from neutral into high speed.

The backward movement of the pedal inclines the plane of the holder 15. It will be understood that since there is no pressure in the cylinders 7 and 20, when the engine is idling because there is no pumping action, the energy from the spring 122 is just great enough to start the pedal backward from neutral or idling position, and because of this backward movement the sleeve 44 is shifted rearwardly, that is, toward the extension 58, to incline the holder 15 from the perpendicular, and to lessen the inclination of the holder 30. The ring 11 is rotating rapidly against the face of the holder 15, and the said ring will be given a rapid, but very slight, gyratory motion. The pistons 8 are connected to the ring 11, and are consequently given a stroke in proportion to the magnitude of the gyration of the ring 11. The stroke of the said pistons at first is very short, and consequently a very small volume of oil is forced through the valve 61 into the cylinders 20. The pistons in the said cylinders 20 at this instant are capable of taking their greatest stroke. Therefore, when the above mentioned volume of oil, which is under great pressure due to the extremely short stroke of the piston 8, is forced into the cylinders 20, the pistons 21 will exert great force against the ring 24 due to the connecting rods 22. Since the holder 30 is at its smallest angle to the shaft 4, any pressure parallel to the shaft and against the ring 30 will force the holder to revolve and the shaft 4 will be carried therewith, the said shaft being attached to the holder.

If the operator wishes to further increase the speed of his vehicle, he will permit the treadle to move backwardly, controlling the same with the foot or with the handle 131. From the instant the first pressure is generated in the clutch unit until the instant when all pressure ceases, variable speed and traction are obtained. Such pressure is at all times controlled by the operation of the treadle which in turn operates the valve 82. When the treadle is moved forwardly the valve is rotated slightly, bringing the extension at one end of the groove into register with the port 80, and connecting that end of the cylinder adjacent to the treadle with the chamber 85. Thus the oil may gradually escape to permit the treadle to return to backward position. With the valve 83 in closed position, however, this action would not be permitted. When the treadle is in rearward position the extension at the other end of the port 84 is in register with the passage 77, and the oil may escape from behind the piston.

It will be noticed from an inspection of Fig. 5 that the valve 61 has ports 135 which are controlled by ball check valves 136, and the ports communicate with the ports 71 to feed oil from the casing into the ports 71.

In Figs. 6 and 7 are shown the piston rings 137 for the valve 61. These rings are three in number, and they are supported by cross bars 138 arranged transversely of the recesses 139 in which the rings are arranged. These cross bars are pressed outwardly by springs 140 which are arranged beneath the cross bars. Bushings 141 and 142 are arranged between the cylinder supporting casings 5 and 19, and between the cylinder casing 19 and the sleeve 46, respectively, and a filling opening is provided in the fixed or outer casing for admitting oil, the said opening being normally closed by a threaded plug 143. A second opening is provided for draining the casing 5, the said opening being normally closed by a threaded plug 144. The filling opening is in the extension 58, at the upper side thereof, while the drain opening is at the opposite end of the casing 5.

It will be evident from the foregoing description that the driven shaft can be brought up to the speed of the driving shaft gradually and smoothly, and finally connected positively to the said driving shaft without friction or direct dogging devices. The boosting unit will receive all of the slip of the clutch unit, which otherwise would be wasted, and will transform it into use for work on the driven shaft. The clutch and boosting units are controlled a part of the time simultaneously, and the reciprocating parts are at rest while the driven shaft is stationary and the driving shaft rotating, as well as when the driven and driving shafts are rotating at the same speed.

The improved transmission is silent, and absolutely smooth in action, and all variable speeds, a neutral condition, and a braking of the vehicle against the motor compression and against the frame of the vehicle are controlled by a single pedal, and this pedal can be made to regulate the speed on the slightest motion on the part of the operator, thus eliminating excessive spring tension and extra effort. The oil which is used for transmitting power to the driven shaft also lubricates the parts, without necessitating auxiliary chambers and piping, and frequent replenishment of the oil is unnecessary. The handle 131 can progressively produce the following functions: first, hold the driven shaft at any definite speed below or at high speed, or at a standstill; second, release any one of the before mentioned actions, thereby permitting the foot pedal to act independently of the position of the lever; third, move the rotary valve into such a position as to cause the gradual or abrupt braking of the driven shaft against the frame of the vehicle; fourth, move the rotary valve into such a position as to lock the driven shaft with the frame of the vehicle; fifth, move the rotary valve into such a position as to reverse the flow of fluid between the two units, thus reversing the driven shaft.

In Figs. 25 and 26 is shown a modified form of controlling mechanism. In this construction the treadle 113ª is pinned to the body 145 of a yoke comprising the said body and arms 147 and 148. The arm 148 of the yoke is pivoted to the frame, as indicated at 149, and the arm 147 of the yoke is pivotally connected to the guide 150 corresponding to the guide 110 of Fig. 8. Coil springs 151 are at the ends of the guide within the chambered portion of the body of the fork 109. The construction, so far as the treadle connection is concerned, is otherwise the same as that shown in Fig. 8. The cylinder 73ª corresponding to the cylinder 73 of Fig. 8 has arranged therein the piston 74ª which is connected by the rod 75ª to the yoke 109. The valve 82ª corresponding to the valve 82 of Fig. 8 is arranged at that end of the cylinder adjacent to the treadle instead of at the opposite end as shown in Fig. 8. This valve is operated by the bell crank 95 and the valve 83ª corresponding to the valve 83 of Fig. 8 is operated in the same manner as the valve 83.

A valve 84ª corresponding to the valve 84 of Fig. 8 is arranged at the opposite end of the cylinder from the valve 84, as is also the valve 81ª corresponding to the valve 81ᵇ of Fig. 8. The valves 84ª and 81ª are, however, adapted to be operated to admit fluid under pressure to the cylinder.

The operation of the construction shown in Figs. 25 and 26 is the same as that shown in Fig. 8.

We claim:

1. A transmission mechanism, comprising in combination with the alined driving shaft and driven shaft, a fixed casing, a casing rotatable in the fixed casing and secured to the driving shaft, each casing carrying an annular series of cylinders parallel and concentric with the shafts, pistons in the cylinders, a ring for each series, connecting rods connecting the pistons with the respective rings, an annular guide for each ring and abutting the ring, and against which the ring moves, said guides being connected to the driven shaft and rotating therewith, ports connecting the series of cylinders, a valve for controlling the said ports, the casings being adapted to contain oil, and the valve having ports for constraining the oil to move in a direction to drive the driven shaft forwardly or in the reverse direction, means for constraining the guides to move in opposite directions to vary the inclination of the rings with respect to the shafts, manually operated means controlling said constraining means for moving the guides to neutral position, a spring for moving the guides to high speed position, fluid-controlled means for controlling the action of the spring, means in connection with the said means for locking the spring from action, and a common means for operating the valve and the said last named means.

2. A transmission mechanism, comprising in combination with the alined driving shaft and driven shaft, a fixed casing, a casing rotatable in the fixed casing and secured to the driving shaft, each casing carrying an annular series of cylinders parallel and concentric with the shafts, pistons in the cylinders, a ring for each series, connecting rods connecting the pistons with the respective rings, an annular guide for each ring and abutting the ring, and against which the ring moves, said guides being connected to the driven shaft and rotating therewith, ports connecting the series of cylinders, a valve for controlling the said ports, the casings being adapted to contain oil, and the valve having ports for constraining the oil to move in a direction to drive the driven shaft forwardly or in the reverse direction, means for constraining the guides to move in opposite directions to vary the inclination of the rings with respect to the shafts, manually operated means controlling said constraining means for moving the guides to neutral position, a spring for moving the guides to high speed position, and means for braking the action of the spring controlled by the forward movement of the manually operated means.

3. A transmission mechanism, comprising in combination with the alined driving shaft and driven shaft, a fixed casing, a casing rotatable in the fixed casing and secured to the driving shaft, each casing carrying an annular series of cylinders parallel and concentric with the shafts, pistons in the cylinders, a ring for each series, connecting rods connecting the pistons with the respective rings, an annular guide for each ring and abutting the ring, and against which the ring moves, said guides being connected to the driven shaft and rotating therewith, ports connecting the series of cylinders, a valve for controlling the said ports, the casings being adapted to contain oil, and the valve having ports for constraining the oil to move in a direction to drive the driven shaft forwardly or in the reverse direction, means for constraining the guides to move in opposite directions to vary the inclination of the rings with respect to the shaft, manually operated means controlling said constraining means for moving the guides to neutral position, and a spring for moving the guides to high speed position.

4. A transmission mechanism, comprising in combination with the alined driving shaft and driven shaft, a fixed casing, a casing rotatable in the fixed casing and secured to the driving shaft, each casing carrying an annular series of cylinders parallel and concentric with the shafts, pistons in the cylinders, a ring for each series, connecting rods connecting the pistons with the respective rings, an annular guide for each ring and abutting the ring, and against which the ring moves, said guides being connected to the driven shaft and rotating therewith, ports connecting the series of cylinders, a valve for controlling the said ports, the casings being adapted to contain oil, and the valve having ports for constraining the oil to move in a direction to drive the driven shaft forwardly or in the reverse direction, and means for simultaneously moving the guides in opposite directions to vary the inclination of the rings with respect to the shafts.

5. A transmission mechanism, comprising in combination with the alined driving and driven shafts, a fixed casing, a casing rotatable in the fixed casing and secured to the driving shaft, each casing carrying an annular series of cylinders parallel and concentric with the shafts, pistons in the cylinders, a ring for each series of cylinders and connected to the pistons, guides for the rings connected with the driven shaft and mounted to swing with respect thereto, means for simultaneously moving the guides in opposite directions, the casings being adapted to contain oil, and means for causing the oil to flow in a direction to move the driven shaft forwardly or in the reverse direction.

6. A transmission mechanism comprising in combination with the alined driving shaft and driven shaft, a fixed and a rotatable casing, the rotatable casing being secured to the driving shaft and rotating in the fixed casing, each casing carrying a series of pumps arranged parallel and concentric with the shafts, a ring for each series to which the plungers of the series are connected, said rotatable casing being adapted to contain oil, and means for simultaneously swinging the rings in opposite directions, said means being secured to the driven shaft and rotating therewith.

7. A transmission mechanism comprising in combination with the alined driving and driven shafts, a series of pumps carried by the driving shaft, a series of fixed pumps, both series encircling the driven shaft, a ring for each series of pumps connected to the reciprocating portion of the series, and means connected with the driven shaft and rotating therewith for simultaneously swinging the rings in opposite directions, said pumps delivering to each other, and means for reversing the direction of fluid from the pumps.

8. A transmission mechanism comprising in combination with the alined driving and driven shafts, a series of pumps carried by the driving shaft, a series of fixed pumps, both series encircling the driven shaft, a ring for each series of pumps connected to the reciprocating portions of the series, and means connected with the driven shaft and rotating therewith for simultaneously swinging the rings in opposite directions, said pumps delivering to each other.

ELWYN METTE RAYBURN.
ALDEN GRANVILLE RAYBURN.